(12) United States Patent
Williams et al.

(10) Patent No.: US 6,732,190 B1
(45) Date of Patent: May 4, 2004

(54) METHOD AND APPARATUS FOR CONSERVING POWER CONSUMED BY A NETWORK INTERFACE DEVICE IN PACKET FILTERING MODE

(75) Inventors: Steven D. Williams, Portland, OR (US); Amir Zinaty, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/265,033

(22) Filed: Mar. 9, 1999

(51) Int. Cl.[7] .............................................. G06F 15/16
(52) U.S. Cl. ........................ 709/250; 713/300; 713/323
(58) Field of Search .......................... 709/200, 250; 713/300, 323; 370/474

(56) References Cited

U.S. PATENT DOCUMENTS

| | | | | |
|---|---|---|---|---|
| 4,680,781 A | * | 7/1987 | Amundson et al. ......... 375/222 |
| 5,371,734 A | * | 12/1994 | Fischer ........................ 370/311 |
| 6,065,121 A | * | 5/2000 | Hobson et al. ............. 713/300 |
| 6,243,821 B1 | * | 6/2001 | Reneris ....................... 713/323 |
| 6,272,642 B2 | * | 8/2001 | Pole, II et al. .............. 713/300 |

* cited by examiner

Primary Examiner—Frantz B. Jean
(74) Attorney, Agent, or Firm—Blakely, Sokoloff, Taylor & Zafman LLP (57) ABSTRACT

In one embodiment, in response to receiving a notification to enter a packet filtering mode of operation for a NIC operating a link to a hub/switch in a normal mode of operation at one operating speed, a lower power consuming operating speed is re-negotiated with the hub/switch for the NIC to operate the link in the packet filtering mode. In another embodiment, another link to the hub/switch through another NIC is operated in the packet filtering mode at a lower power consuming speed, in place of the original link and NIC instead. In yet another embodiment, the lowest power consuming NIC among a number of jointly operating NICs is operated in the packet filtering mode, with the remaining NICs being shut down.

38 Claims, 4 Drawing Sheets

METHOD AND APPARATUS FOR CONSERVING POWER CONSUMED BY A NETWORK INTERFACE DEVICE IN PACKET FILTERING MODE

BACKGROUND OF THE INVENTION

1. Field of the Invention

The present invention relates to the field of managing power consumption in a computer system. More specifically, the present invention relates to the management of power consumption by a network interface device (also referred to as network interface card or NIC for short).

2. Background Information

Today, most computer systems are equipped with power management features. Their constituting components are power management enabled, i.e. they include provisions through which a power management enabled operating system may put some or all of these components into low-to-no function power saving modes when the components' services are not needed. The components are brought back to the full function normal power consumption mode of operation when their services are needed again. Examples of these computer systems include ACPI compliant systems equipped with Window 95 or later (available from Microsoft Corp. of Redmond, Wash.). ACPI compliant means compliance with the Advanced Power and Configuration Interface specification, revision 1.0 or later, available from Intel Corp. of Santa Clara, Calif., a co-developer of the specification, and assignee of the present application.

Today, many computer systems are also equipped with NICs to enable the computer systems to be connectable to local, wide area or global networks, such as the Internet, via links to networking devices such as hubs or switches. For power management equipped computer systems, these NICs are equipped to operate in at least a full function normal power consumption mode, or a low function power saving consumption mode (selectably entered in response to instructions from the operating systems). Under the low function power saving consumption mode, a NIC would monitor the link for packets directed to the "host" computer system (i.e. the computer system on which the NIC is installed), where the "host" computer system should be awakened to process the packets. This low function power saving consumption mode of operation is referred to as the "packet filtering" mode of operation.

Many NICs support only one speed of operation. Thus, the link is operated at the same speed regardless of whether the NIC is operating in the full function or packet filtering mode. Historically, this was not a problem, as the power required to sustain such packet filtering mode of operation (i.e. with the link being operated at the same speed as in the full function mode of operation), was well within the power available from the interconnecting system bus under a power saving mode of operation. For example, a Ethernet NIC typically requires only 0.5 watts to operate a link in the packet filtering mode at 100 Mbps, which is well within the 1.2 watts available from an interconnecting PCI bus under a power saving mode of operation. However, with the advent of higher operating speeds for networking links, this has become a problem; as many of these NICs that support only the higher ones of these operating speeds require more power to operate in the packet filtering mode than the power available from the interconnecting buses operating under a power saving mode, e.g., in the case of a gigabit Ethernet NIC interconnected to a PCI bus. As a result, these NICs and other interconnected components cannot be placed into the low function power saving mode of operation.

This problem exists also in NICs that support multiple speeds of operation, even though the multiple speeds include the lower speeds that in and of themselves would have required power that is within the power available from the interconnecting buses. The reason is because the actual full function operating speed is dynamically negotiated between the NIC and the interconnecting hub/switch. Often times, it is the higher speeds that are selected. Once the higher speeds are negotiated, these prior art NICs operate the links at the negotiated speeds, regardless of whether they are operating in the full function mode of operation or in the packet filtering mode of operation. Thus, upon establishing one of these higher power requirement operating speeds, these multi-speed NICs are no different from the single high speed NICs, as far as power management is concerned.

Thus, an improved NIC power management technique, without some of these disadvantages of the prior art, is desired.

SUMMARY OF THE INVENTION

A notification is received for a NIC operating a link to a hub/switch in a normal mode of operation at one operating speed to enter a packet filtering mode of operation. In response, a lower power consuming operating speed is re-negotiated with the hub/switch for the NIC to operate the link in the packet filtering mode.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as hubs, switches, links, packets, and so forth. Also, parts of the description will also be presented in terms of operations performed by a computer system, using terms such as establishing, negotiating, and so on. As well understood by those skilled in the art, these operations take the form of electrical, magnetic, or optical signals capable of being stored, transferred, combined, and otherwise manipulated through electrical components of a digital system; and the term digital system includes general purpose as well as special purpose data processing machines, systems, and the like, that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
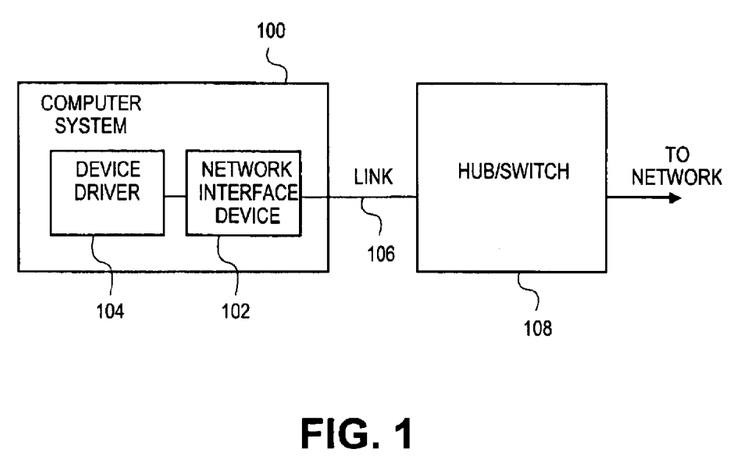
FIGS. 1–3 illustrate the present invention in accordance with one embodiment, with FIG. 1 showing a hardware view, and FIGS. 2–3 showing the operational steps of the device driver of the NIC.
Figure 2:
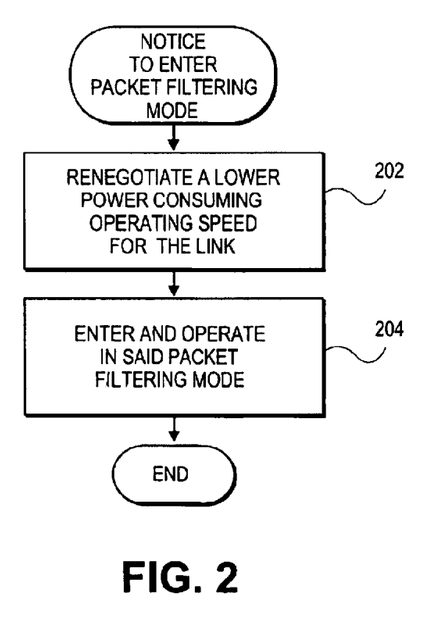
Figure 3:
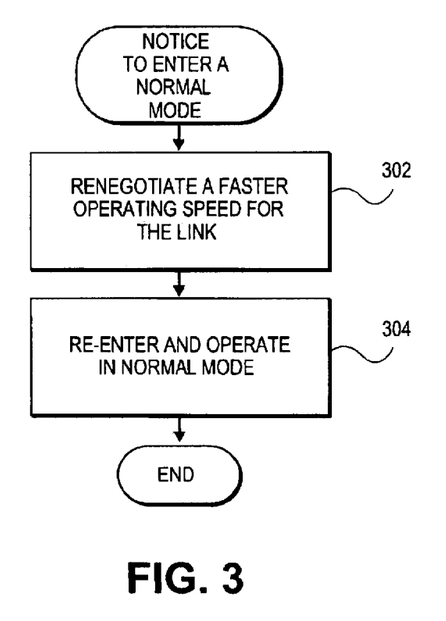

Referring now to FIGS. 1–3, wherein the present invention in accordance with one embodiment is illustrated. Shown in FIG. 1 is example computer system 100 provided with NIC 102 and its device driver 104, which is incorporated with the power management teachings of the present invention. For the illustrated embodiment, NIC 102 is interconnected to other components of computer system 100 via a system bus (not shown) equipped with power management features, and device driver 104 is executed out of memory (not shown) of computer system 100 as an add-on to a power management equipped operating system. In general, NIC 102 and device driver 104 perform their conventional functions known in the art. That is, together they facilitate connection of computer system 100 to a local, wide area or global network, such as the Internet, via link 106 to a networking device, such as hub/switch 108. However, NIC 102 and device driver 104 are of the kind that support multiple operating speeds for link 106. More specifically, NIC 102 and device driver 104 negotiate with hub/switch 108 to establish the operating speed under a full function normal power consuming mode of operation for link 106. Typically, the highest possible operating speed supported by both NIC 102 and hub/switch 108 is selected. Except for the power management teachings of the present invention incorporated, NIC 102 and device driver 104 are intended to represent a broad range of these elements known in art, including but not limited to Ethernet NICs and their device drivers, such as the Pro/100+ PCI Adapter, available from Intel Corp. Similarly, hub/switch 108 is intended to represent a broad range of hub and switch devices known in the art, e.g. the Express 200 series hub and Express 500 series switches, available from Intel Corp. Thus, except for the power management teachings of the present invention incorporated with device driver 104, NIC 102, device driver 104 and hub/switch 108 will not be otherwise further described.

FIGS. 2–3 illustrate the power management operating steps of device driver 104 in accordance with the present invention. As shown in FIG. 2, upon receipt of a notification to enter NIC 102 into a low power consuming packet filtering mode of operation, while NIC 102 is operating in a full function normal power consuming mode of operation at a negotiated operating speed, before doing so, at 202, device driver 104 first re-negotiates with hub/switch 108 to establish a lower power consuming operating speed for NIC 102 to operate link 106. Upon successfully establishing the lower power consuming operating speed for NIC 102 to operate link 106, at 204, device driver 104 then places NIC 102 in the packet filtering mode of operation with link 106 to be operated in the re-negotiated lower power consuming speed. As shown in FIG. 3, upon receipt of a notification to re-enter NIC 102 into the full function normal power consuming mode of operation, again before doing so, at 302, device driver 104 first re-negotiates with hub/switch 108 to establish a faster operating speed for NIC 102 to operate link 106. Upon successfully establishing the faster operating speed for NIC 102 to operate link 106, at 304, device driver 104 then places NIC 102 in the full function normal power consuming mode of operation with link 106 to be operated in the re-negotiated faster operating speed. Thus, with these novel re-negotiations, NIC 102 may be advantageously put into a power saving packet filtering mode of operation, even though if in its full function normal power consuming mode of operation, NIC 102 may operate link 106 at a high speed that if unchanged, would otherwise require power beyond that is available from the interconnect bus of computer system 100.

Figure 4:
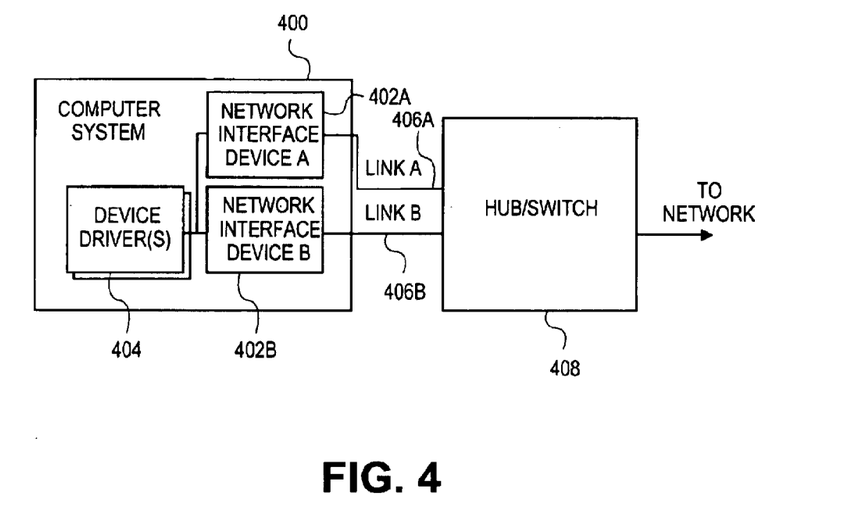
FIGS. 4–6 illustrate the present invention in accordance with another embodiment, with FIG. 4 showing a hardware view, and FIGS. 5–6 showing the operational steps of the device driver of the NIC.
Figure 5:
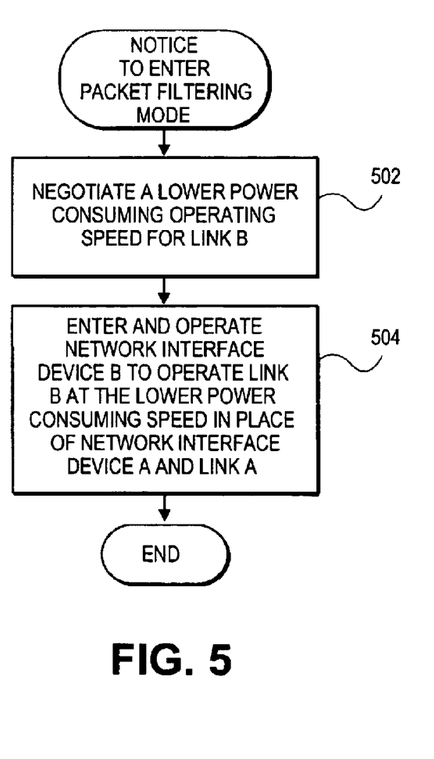
Figure 6:
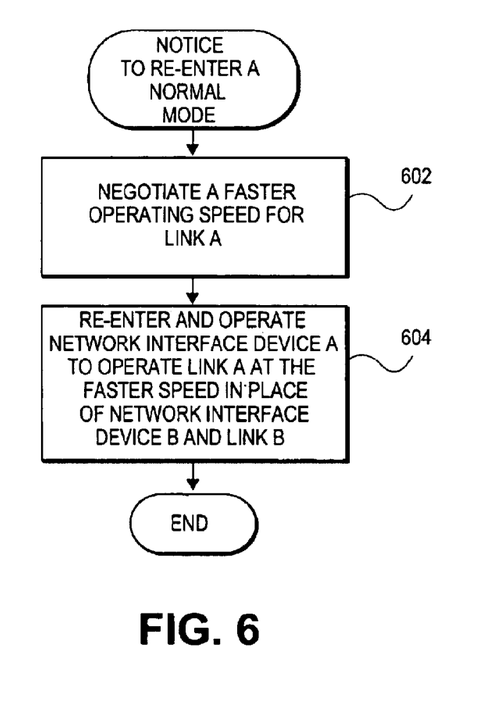

Referring now to FIGS. 4–6, wherein the present invention in accordance with another embodiment is illustrated. Shown in FIG. 4 is example computer system 400 provided with NICs 402a and 402b, and their device driver or device drivers 404 (an implementation choice), which are incorporated with the power management teachings of the present invention. Similar to the earlier described embodiment, for this embodiment, NIC 402a–402b are also connected to other components of computer system 400 via a system bus (not shown), and device drivers 404 are executed out of memory (not shown) of computer system 400 as add-on to a power management equipped operating system. In general, NICs 402a–402b and device drivers 404 also perform their conventional functions known in the art. That is, together they facilitate connection of computer system 400 to a local, wide area or global network, such as the Internet, via links 406a and 406b to a networking device, such as hub/switch 408. Each of NIC 402a–402b supports one operating speed for its link. For the illustrated embodiment, NIC 402a supports a higher operating speed for link 406a than the operating speed supported by NIC 402b for link 406b. Furthermore, at least NIC 402b supports the dynamic assumption of a new media access control (MAC) address. Thus, computer system 400 is connected to hub/switch 408 via NIC 402a and link 406a during a full function normal power consuming mode of operation, and via NIC 402b and link 406b during a low power consuming packet filtering mode of operation. Except for the power management teachings of the present invention incorporated, NICs 402a–402b and device driver 404 are similarly intended to represent a broad range of these elements known in art. Likewise, hub/switch 408 is intended to represent a broad range of hub and switch devices known in the art. Thus, except for the power management teachings of the present invention incorporated with device driver 404, NICs 402a–402b, device driver 404 and hub/switch 408 will not be otherwise further described.

FIGS. 5–6 illustrate the power management operating steps of device drivers 404 in accordance with the present invention. As shown in FIG. 5, upon receipt of a notification to enter NIC 402a into a low power consuming packet filtering mode of operation, while NIC 402a is operating link 406a in a full function normal power consuming mode of operation at the higher operating speed, at 502, device driver 404 negotiates with hub/switch 408 to establish link 406b for NIC 402b at the lower operating speed supported by NIC 402b. Upon successfully establishing link 406b to NIC 402b at the lower operating speed, at 504, device drivers 404 then places NIC 402b in the packet filtering mode of operation with link 406b to be operated in the lower operating speed, in place of NIC 402a and link 406a, thereby consuming lower power when operating in the packet filtering mode. In one embodiment, the operations performed by device drivers 404 at 504 include having NIC 402b assume the ownership for a media access control (MAC) address previously owned by NIC 402a when operating link 406a. The operations further include shutting down NIC 402a. As shown in FIG. 6, upon receipt of a notification to re-enter NIC 402b into the full function normal power consuming mode of operation, again before doing so, at 602, device drivers 404 first re-establish with hub/switch 408 link 406a for NIC 402a at the faster operating speed supported by NIC 402a. Upon successfully establishing link 406a to NIC 402a at the faster operating speed, at 604, device drivers 404 then place NIC 402a back into the full function normal power consuming mode of operation with link 406a to be operated in the faster operating speed supported, in place of link 406b and NIC 402b. Similarly, in one embodiment, the operations performed by device drivers 404 at 604 include having NIC 402a re-assumes the ownership for the MAC address previously owned. The operations also further include shutting down NIC 402b. Thus, with this novel switching between NICs with different operating speed supported and therefore, different power consumption levels, NIC 402a may be virtually put into a power saving packet filtering mode of operation, even though if in its normal mode of operation, NIC 402a operates link 406a at a high speed that may otherwise require power beyond that is available from the interconnect bus of computer system 400.

Figure 7:
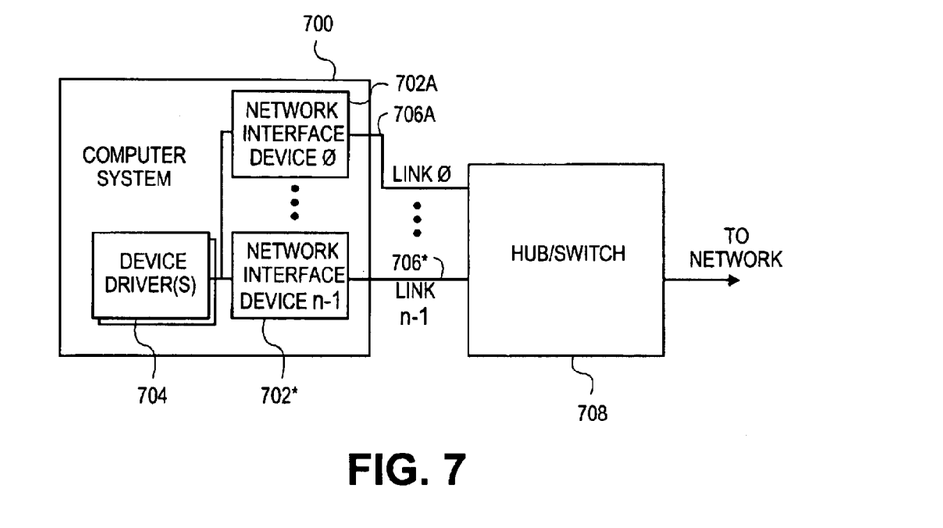
FIGS. 7–9 illustrate the present invention in accordance with yet another embodiment, with FIG. 7 showing a hardware view, and FIGS. 8–9 showing the operational steps of the device driver of the NIC.
Figure 8:
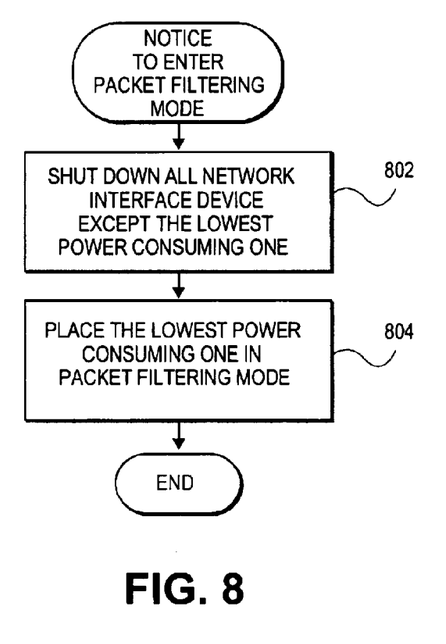
Figure 9:
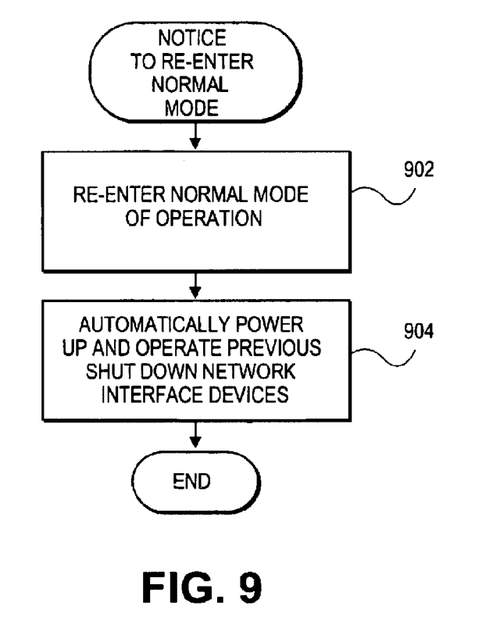

Referring now to FIGS. 7–9, wherein the present invention in accordance with yet another embodiment is illustrated. Shown in FIG. 7 is example computer system 700 provided with n NICs 702a through 702* (n being an integer and * being a "wild card"), and their device driver or device drivers 704 (an implementation choice), which are incorporated with the power management teachings of the present invention. Similar to the earlier described embodiments, NIC 702a–702* are also connected to other components of computer system 700 via a system bus (not shown), and device drivers 704 are executed out of memory (not shown) of computer system 700 as add-on to a power management equipped operating system. In general, NICs 702a–702* and device drivers 704 also perform their conventional functions known in the art. That is, together they facilitate connection of computer system 700 to a local, wide area or global network, such as the Internet, via links 706a through 706b to a networking device, such as hub/switch 708. Each of NIC 702a–702* supports one operating speed for its link, where the supported operating speed may or may not be the same. However, for the illustrated embodiment, during a normal mode operation, all NICs, 702a–702* are in operation, to provide an aggregate networking bandwidth for computer system 700 that is greater than any of NIC 702a–702* can provide individually or in selective combination among a subset of the NICs. Furthermore, at least a lowest power consuming NIC 702i(i being an index between a and *) also supports the dynamic assumption of n−1 additional new MAC addresses. Thus, computer system 700 is connected to hub/switch 708 via NICs 702a–702* and link 706a–706* during a full function normal power consuming mode of operation, and via a lowest power consumption NIC 702i and link 706i during a low power consuming packet filtering mode of operation. Except for the power management teachings of the present invention incorporated, NICs 702a–702* and device driver 704 are similarly intended to represent a broad range of these elements known in art. Likewise, hub/switch 708 is intended to represent a broad range of hub and switch devices known in the art. Thus, except for the power management teachings of the present invention incorporated with device driver 704, NICs 702a–702*, device driver 704 and hub/switch 708 will not be otherwise further described.

FIGS. 8–9 illustrate the power management operating steps of device drivers 704 in accordance with the present invention. As shown in FIG. 8, upon receipt of a notification to enter a low power consuming packet filtering mode of operation, while all NICs 702a–702* are correspondingly operating links 706a–706* in a full function, normal power consuming, aggregate mode of operation with varying operating speeds, at 802, device drivers 704 shut down all NICs 702a–702*, except one, preferably, the lowest power consuming one 702i. In one embodiment, device drivers 704 are pre-configured with the identity of NIC 702i to remain operational, whereas in another embodiment, device drivers 704 dynamically determine the identity of NIC 702i to remain operational. In any event, upon shutting down NICs 702a–702* (except 702i), at 804, device drivers 704 place the remaining NIC 702i in the packet filtering mode of operation with link 706i to be operated in the corresponding lowest operating speed, on behalf of all previously operating NICs 702a–702* and links 706a–706*, thereby consuming lower power when operating in the packet filtering mode. In one embodiment, the operations performed by device drivers 704 at 804 include having NIC 702i assumes the ownership for MAC addresses previously owned by the shut down NIC 702a–702* (except 702i). As shown in FIG. 9, upon receipt of a notification to re-enter NIC 702i into the full function normal power consuming mode of operation, again before doing so, at 902, device drivers 704 first re-establish with hub/switch 708 links 706a–706* (except 706i) for NICs 702a–702* (except 702i) at the various faster operating speeds supported. Upon successfully establishing links 706a–706* (except 706i) to NIC 702a–702* (except 702i) at the faster operating speeds, at 904, device drivers 704 then place NIC 702i also back into the full function normal power consuming mode of operation joining the other NICs already in the normal mode of operation. Similarly, in one embodiment, the operations performed by device drivers 704 at 904 include having NIC 702a–702* (except 702i) re-assumes the ownership for the corresponding MAC addresses previously owned. Thus, with this novel selective shut down of NICs and automatic resumption, a NIC 702j (j is also index between a–*) may be virtually put into a power saving packet filtering mode of operation, even though if in its normal mode of operation, NIC 702j operates link 706j at a high speed that may otherwise require power beyond that is available from the interconnect bus of computer system 700.

The above described embodiment may also be practiced with more than one low power consuming network interface device being placed in the packet filtering mode of operation on behalf of the shut down network interface devices. The division of representation between the remaining operational ones and the shut down ones may be arbitrary or pre-determined in accordance with any one of a number of design considerations. This alternate approach has the advantage of lowering the number of MAC addresses a remaining operational one has to assume, if MAC address assumption is also practiced.

Figure 10:
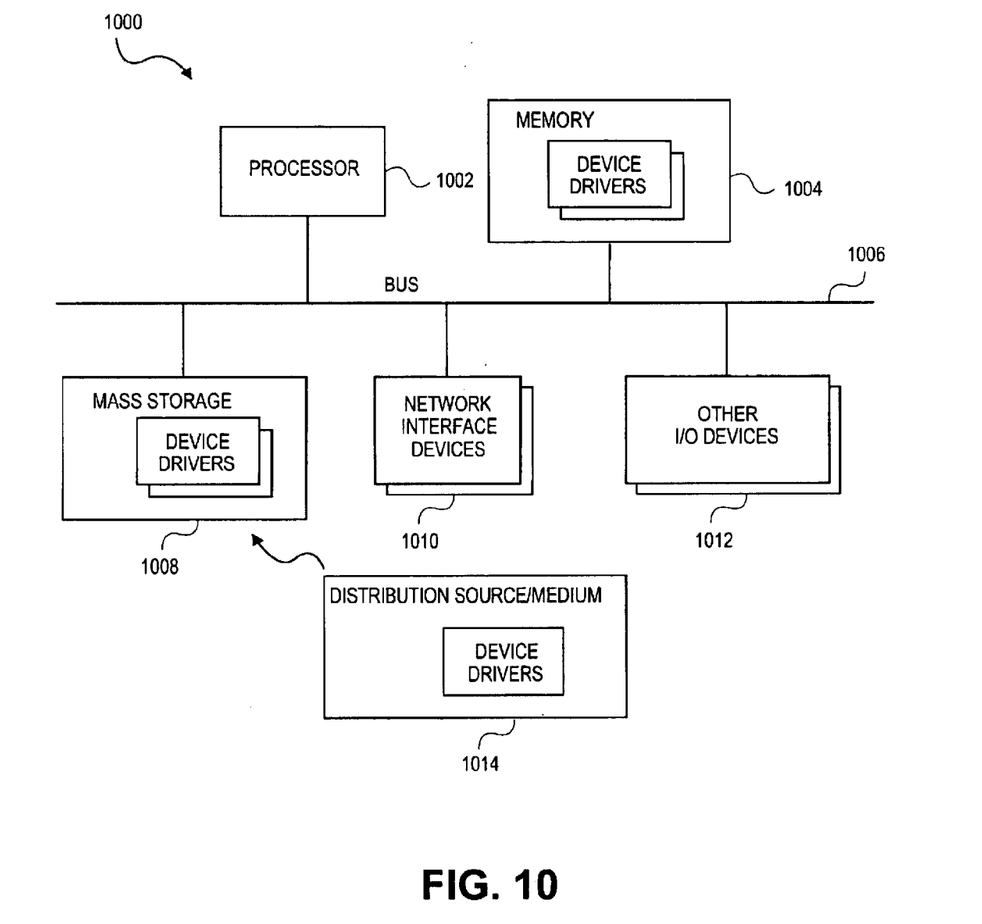
FIG. 10 illustrates an example computer system suitable for practicing the present invention.

FIG. 10 illustrates an example computer system suitable for use to practice the present invention. As shown, computer system 1000 includes processor 1002 and memory 1004 coupled to each other via system bus 1006. Coupled to system bus 1006 are non-volatile mass storage 1008, such as hard disks, floppy disk, and so forth, network interface device or devices 1010, and other input/output devices 1012, such as keyboard, displays, and so forth. Each of these elements perform its conventional functions known in the art. In particular, system memory 1004 and non-volatile mass storage 1008 are employed to store a working copy and a permanent copy of the programming instructions implementing device driver 104 or device drivers 404/704 described earlier. The permanent copy of the programming instructions to practice the present invention may be loaded into non-volatile mass storage 1008 in the factory, or in the field, using distribution source/medium 1014. Examples of distribution medium 1014 include recordable medium such as tapes, CDROM, DVD, and so forth.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

Thus, a method and an apparatus for conserving power consumed by a network interface device have been described.

What is claimed is:

1. A method comprising:
   receiving a notification to enter a packet filtering mode of operation for a network interface device operating a link to a hub/switch in a normal mode of operation at a first operating speed; and
   re-negotiating, in response to the notification to switch from the normal mode to the packet filtering mode, with the hub/switch for the network interface device to operate the link in said packet filtering mode at a second operating speed, under which the network interface device will consume less power than power consumed by the network interface device operating the link at the first operating speed.

2. The method of claim 1, wherein the method further comprises
   receiving a notification for the network interface device to resume operating the link in the normal mode of operation; and
   re-negotiating, in response to the notification to resume the normal mode, with the hub/switch for the network interface device to operate the link at a third operating speed that is faster than the second operating speed.

3. The method of claim 2 wherein the first and the third operating speeds are the same speed.

4. A method comprising:
   receiving a notification for the network interface device to resume operation of a link to a hub/switch in a normal mode of operation, the network interface device operating the link in a packet filtering mode at a power-saving first operating speed; and
   re-negotiating, in response to the notification to switch from the packet filtering mode to the normal mode, with the hub/switch for the network interface device to operate the link at a second operating speed that is faster than the first operating speed.

5. A method comprising:
   receiving a notification for a first network interface device to enter a packet filtering mode of operation for a first link to a hub/switch, the first network interface device operating the first link in a normal mode of operation at a first operating speed;
   operating, in response to the notification to switch from the normal mode to the packet filtering mode, a second link to the hub/switch through a second network interface device, in place of said first link and said first network interface device, in said packet filtering mode at a second operating speed, under which the second network interface device will consume less power than power consumed by the first network interface device operating the first link at said first operating speed.

6. The method of claim 5 wherein the method further comprises assuming ownership by the second network interface device to a media access control address previously owned by the first network interface device.

7. The method of claim 5 wherein the method further comprises establishing the second link, negotiating said second operating speed for said second link, and terminating the first link.

8. The method of claim 5, wherein the method further comprises
   receiving a notification for the second network device to resume operating the second link in said normal mode of operation; and
   operating, in response to the notification to resume the normal mode, said first link through said first network interface device, in place of said second link and said second network interface device, in said normal mode of operation at a third operating speed that is faster than the second operating speed.

9. The method of claim 8 wherein the first and the third operating speeds are the same speed.

10. The method of claim 8 wherein the method further comprises re-assuming ownership by the first network interface device to said media access control address.

11. The method of claim 8 wherein the method further comprises re-establishing the first link, negotiating said third operating speed for said first link, and terminating the second link.

12. A method comprising:
    receiving a notification for a first network device to resume operating a first link in a normal mode of operation, the first network device operating the first link in a packet filtering mode at a power-saving first operating speed; and
    operating, in response to the notification to switch from the packet filtering mode to the normal mode, a second link through a second network interface device, in place of said first link and said first network interface device, at a second operating speed that is faster than the first operating speed.

13. The method of claim 12 wherein the method further comprises re-assuming ownership by the second network interface device to a media access control address.

14. The method of claim 12 wherein the method further comprises re-establishing the second link, negotiating said second operating speed for said second link, and terminating the first link.

15. An article of manufacture comprising
    a recordable medium having recorded thereon a plurality of programming instructions for use to program an apparatus to enable a network interface device of the apparatus to operate a link to a hub/switch, including receiving a notification for the network interface device to enter a packet filtering mode of operation, while operating in a normal mode of operation at a first operating speed, and in response to the notification to switch from the normal mode to the packet filtering mode, re-negotiating with the hub/switch for the network interface device to operate the link in said packet filtering mode at a second operating speed, under which the network interface device will consume less power than power consumed by the network interface device operating the link at the first operating speed.

16. The article of claim 15, wherein the programming instructions further enable the network interface device of the apparatus to operate the link in a manner that includes receiving a notification for the network interface device to resume operating the link in the normal mode of operation, and in response to the notification to resume the normal mode, re-negotiating with the hub/switch for the network interface device to operate the link at a third operating speed that is faster than the second operating speed.

17. An article of manufacture comprising
a recordable medium having recorded thereon a plurality of programming instructions for use to program an apparatus to enable a network interface device of the apparatus to operate a link to a hub/switch, including receiving a notification for the network interface device to resume operation of the link in a normal mode of operation, while operating the link in a packet filtering mode at a power-saving first operating speed, and in response to the notification to switch from the packet filtering mode to the normal mode, re-negotiating with the hub/switch for the network interface device to operate the link at a second operating speed that is faster than the first operating speed.

18. An article of manufacture comprising
a recordable medium having recorded thereon a plurality of programming instructions for use to program an apparatus to enable a first and a second network interface device of the apparatus to operate a first and a second link to a hub/switch respectively, including receiving a notification for the first network interface device to enter a packet filtering mode of operation, while operating the first link in a normal mode of operation at a first operating speed, and in response to the notification to switch from the normal mode to the packet filtering mode, operating the second link in place of the first link and the first network interface device, in said packet filtering mode at a second operating speed, under which the second network interface device will consume less power than power consumed by the first network interface device operating the first link at said first operating speed.

19. The article of claim 18, wherein the programming instructions further enable the first and second network interface devices of the apparatus to operate the first and second links respectively in a manner that includes receiving a notification for the second network device to resume operating the second link in said normal mode of operation, and in response to the notification to resume the normal mode, operating said first link through said first network interface device in place of said second link and said second network interface device in said normal mode of operation at a third operating speed that is faster than the second operating speed.

20. An article of manufacture comprising
a recordable medium having recorded thereon a plurality of programming instructions for use to program an apparatus to enable a first and a second network interface device of the apparatus to operate a first and a second link to a hub/switch respectively, including receiving a notification for the first network device to resume operating the first link in a normal mode of operation, while operating in a packet filtering mode at a power-saving first operating speed, and in response to the notification to switch from the packet filtering mode to the normal mode, operating a second link through a second network interface device in place of said first link and said first network interface device at a second operating speed that is faster than the first operating speed.

21. An apparatus comprising:
a network interface device to operate a link to a hub/switch; and
a device driver to control the network interface device including negotiation with the hub/switch for an operating speed for the link, wherein the device driver re-negotiates with the hub/switch to operate the link at a power saving first operating speed, in response to receiving a notification for the network interface device to enter a packet filtering mode of operation while the network interface device is operating the link in a normal mode of operation at a more power consuming second operating speed.

22. The apparatus of claim 21, wherein the device driver further re-negotiates with the hub/switch to operate the link at a third speed that is faster than the power saving first operating speed, in response to receiving a notification for the network interface device to resume operating the link in the normal mode of operation.

23. An apparatus comprising:
a network interface device to operate a link to a hub/switch;
a device driver to control the network interface device, including negotiation with the hub/switch for an operating speed for the link, wherein the device driver re-negotiate for a faster first operating speed for the link, in response to receiving a notification for the network interface device to resume operation of the link in a normal mode of operation, while the network interface device is operating the link in a packet filtering mode at a slower power-saving second operating speed.

24. An apparatus comprising:
a first and a second network interface to operate a first and a second link to a hub/switch respectively; and
at least one device driver to control the first and second network interface devices to selectively operate the first and the second links, including negotiation with the hub/switch for operating speeds for the links, wherein the at least one device driver control the first network interface to operate the first link in a normal mode of operation, including negotiation with the hub/switch for a first operating speed for the first link, and control the second network interface to operate the second link in a packet filtering mode of operation, in place of the first network interface device and the first link, in response to receiving a notification for the first network interface device to enter the packet filtering mode of operation, while the first network interface device is operating in the normal mode of operation, including negotiation with the hub/switch for a less power consuming second operating speed for the second link.

25. The apparatus of claim 24, wherein the device driver resumes control of the first network interface device to operate the first link, in place of the second network interface device and the second link, in response to receiving a notification to resume operation in a normal mode of operation, while controlling the second network interface in the packet filtering mode of operation, including negotiation for a third operating speed for the first link, that is faster than the second operating speed for the second link.

26. An apparatus comprising:
a first and a second network interface to operate a first and a second link to a hub/switch respectively; and
at least one device driver to control the first and second network interface devices to selectively operate the first and the second links, including negotiation with the hub/switch for operating speeds for the links, wherein the at least one device driver resumes control of the first network interface device to operate the first link at a first operating speed, in place of the second network interface device and the second link, in response to receiving a notification to resume operation in a normal mode of operation, while controlling the second network interface in a packet filtering mode of operation at a power saving second operating speed, including negotiation for the first operating speed for the first link which is faster than the power saving second operating speed for the second link.

27. A method comprising
receiving a notification to enter a packet filtering mode of operation while a plurality of network interface devices are correspondingly operating a plurality of links to a hub/switch in a normal mode of operation at a plurality of operating speeds; and
in response, selectively shutting down the network interfacing devices, but leaving at least one operational, and having the at least one operational network interface device operate its corresponding link in a packet filtering mode of operation on behalf of all previously operating networking interface devices and links.

28. The method of claim 27, wherein said shutting down and having the at least one operational network interface device operate its corresponding link in a packet filtering mode of operation on behalf of all previously operating networking interface devices comprises shutting down the selected network interface device except a lowest power consuming network interface device, and having the lowest power consuming network interface device operate its corresponding link in a packet filtering mode of operation on behalf of all previously operating networking interface devices and links.

29. The method of claim 27, wherein said shutting down and having the at least one operational network interface device operate its corresponding link in a packet filtering mode of operation on behalf of all previously operating network interface devices comprises having the at least one operational network interface device also assume ownership of media access control (MAC) addresses of the shut down network interface devices.

30. A method comprising:
receiving a notification to re-enter a normal mode of operation for one or more network interface devices while the one or more network interface devices are correspondingly operating one or more links in a low power consuming packet filtering mode of operation on behalf of themselves and their links as well as a plurality of shut down network interface devices and the shut down network interface devices' corresponding links; and
in response, re-entering the one or more network interface devices and re-starting the previously shut down network interface devices to operate all their corresponding links in said normal mode of operation.

31. The method of claim 30, wherein said re-starting of the previously shut down network interface devices comprises having the network interface devices being re-started to reassume their corresponding media access control (MAC) addresses.

32. An article of manufacture comprising:
a recordable medium having recorded thereon a plurality of programming instructions for use to program a computer system to enable the computer system, in response to a notification to enter a packet filtering mode of operation while a plurality of network interface devices of the computer system are correspondingly operating a plurality of links to a hub/switch in a normal mode of operation at a plurality of operating speeds, to selectively shut down the network interfacing devices, but leaving at least one operational, and to have the at least one operational network interface device operate its corresponding link in a packet filtering mode of operation on behalf of all previously operating networking interface devices and links.

33. The article of claim 32, wherein the programming instructions enable the computer system, in response to said notification, to shut down the selected network interface devices except a lowest power consuming network interface device, and to have the lowest power consuming network interface device operate its corresponding link in a packet filtering mode of operation on behalf of all previously operating networking interface devices and links.

34. An article of manufacture comprising:
a recordabe medium having recorded thereon a plurality of programming instructions for use to program a computer system to enable the computer system, in response to receiving a notification to re-enter a normal mode of operation for one or more network interface devices while the one or more network interface devices are correspondingly operating one or more links in a low power consuming packet filtering mode of operation on behalf of themselves and their links as well as a plurality of shut down network interface devices and the shut down network interface devices' corresponding links, to re-enter the one or more network interface devices and re-start the previously shut down network interface devices to operate all their corresponding links in said normal mode of operation.

35. A computer system comprising:
a plurality of network interface devices to correspondingly operate a plurality of links to a hub/switch to jointly provide the computer system with an aggregate sum of networking bandwidth;
at least one device driver to control the network interface devices, including responsive to a notification to enter a packet filtering mode of operation while the plurality of network interface devices correspondingly operating the plurality of links in a normal mode of operation at a plurality of operating speeds, selectively shutting down the network interface devices, but leaving at least one operational, and having the at least one operational network interface device operate its corresponding link in a packet filtering mode of operation on behalf of all previously operating networking interface devices and links.

36. The computer system of claim 35, wherein the at least one device driver's shutting down and having the at least one operating network interface device operate its corresponding links in a packet filtering mode of operation on behalf of all previously operating networking interface devices comprises the at least one device driver controlling the at least one operating network interface device to assume ownership of media access control (MAC) addresses of the shut down network interface devices.

37. A computer system comprising:

a plurality of network interface devices to correspondingly operate a plurality of links to a hub/switch to jointly provide the computer system with an aggregate sum of networking bandwidth;

at least one device driver to control the network interface devices, including responsive to a notification to re-enter one or more of the network interface devices into a normal mode of operation, while the one or more network interface devices are operating their corresponding links in a packet filtering mode on behalf of the one or more network interface devices and their links as well the other network interface devices, which are shut down, and their links, to re-enter the one or more network interface devices and re-start the shut down network interface devices to operate all their corresponding links in said normal mode of operation.

38. The computer system of claim 37, wherein when re-starting the previously shut down network interface devices, the at least one device driver controls the network interface devices being re-started to reassume their corresponding media access control (MAC) addresses.

* * * * *